United States Patent [19]

Inoue

[11] Patent Number: 5,138,009
[45] Date of Patent: Aug. 11, 1992

[54] CURABLE COMPOSITIONS COMPRISING ORGANOPOLYSILOXANE-POLYOXYALKYLENE BLOCK COPOLYMERS AND CURED PRODUCTS OBTAINED FROM THE COMPOSITIONS

[75] Inventor: Yoshio Inoue, Annaka, Japan

[73] Assignee: Shin-Etsu Chemical Co., Ltd., Tokyo, Japan

[21] Appl. No.: 672,241

[22] Filed: Mar. 20, 1991

[30] Foreign Application Priority Data

Apr. 4, 1990 [JP] Japan .................................. 2-91077

[51] Int. Cl.$^5$ ............................................. C08G 77/06
[52] U.S. Cl. ...................................... 528/15; 528/31; 528/32; 525/478; 525/404; 525/412
[58] Field of Search ......................... 528/15, 31, 32; 523/109; 525/478, 404, 412

[56] References Cited

U.S. PATENT DOCUMENTS

| | | | |
|---|---|---|---|
| 2,823,218 | 2/1958 | Speier et al. | 260/448.2 |
| 2,970,150 | 1/1961 | Bailey | 260/348 |
| 3,159,601 | 12/1964 | Ashby | 260/46.5 |
| 3,159,662 | 12/1964 | Ashby | 260/448.2 |
| 3,775,452 | 11/1973 | Kadstelt | 260/429 R |
| 3,814,780 | 6/1974 | Woodhall | 264/54 |
| 3,867,420 | 2/1975 | Morehouse et al. | 528/15 |
| 4,248,750 | 2/1981 | Murakami et al. | 525/478 |
| 4,520,160 | 5/1985 | Brown | 528/15 |
| 4,617,238 | 10/1986 | Crivello et al. | 528/25 |
| 4,812,364 | 3/1989 | Alberts et al. | 525/404 |
| 4,904,745 | 2/1990 | Inoue et al. | 525/404 |

*Primary Examiner*—Melvyn I. Marquis
*Assistant Examiner*—Karen A. Hellender
*Attorney, Agent, or Firm*—Lowe, Price, LeBlanc & Becker

[57] ABSTRACT

A curable composition comprises an organopolysiloxane-polyoxyalkylene block copolymer terminated at both ends of a molecular chain with a lower aliphatic unsaturated group and consists essentially of organopolysiloxane units having a main chain of the formula, $(R^1R^2SiO)m$, and polyoxyalkylene units of the formula, $(R^3O)n$. The organopolysiloxane units and the polyoxyalkylene units are bonded through $R^1R^2SiR^4$ groups, wherein $R^1$ and $R^2$ independently represent an unsubstituted or substituted monovalent hydrocarbon group except for an aliphatic unsaturated group, $R^3$ and $R^4$ independently represent a divalent hydrocarbon group, and m and n are, respectively, defined integers. The composition further comprises an organohydrogenpolysiloxane having at least two ≡SiH groups in one molecule and a curing agent therefor. A cured product obtained from the composition is a silicone rubber elastomer having properties inherent to the silicone rubber but is hydrophilic in nature.

10 Claims, No Drawings

CURABLE COMPOSITIONS COMPRISING ORGANOPOLYSILOXANE-POLYOXYALKYLENE BLOCK COPOLYMERS AND CURED PRODUCTS OBTAINED FROM THE COMPOSITIONS

BACKGROUND OF THE INVENTION

1. Field of the Invention

This invention relates to curable compositions capable of yielding silicone rubber elastomers by curing. More particularly, the invention relates to cured silicone rubber elastomers having hydrophilic properties or water-swelling properties on the surface thereof and also to curable compositions therefor.

2. Description of The Prior Art

As is well known in the art, silicone rubbers have good weatherability, releasing properties and water repellency and, thus, have utility in the fields of sealants, adhesives, releasing agents, templating agents and waterproofing coating agents. However, where the silicone rubbers are employed as a sealant or waterproofing coating agent, there arises a problem from the standpoint of appearance in that although the silicone rubbers exhibit good weatherability and waterproofing properties, not only they are liable to be deposited with dust and dirt, but also rainwater is readily repelled and is left as droplets on the surface of the silicone rubber. If dried as it is, the rubber surface is covered with spots or stains, with a poor appearance.

On the other hand, since silicone rubber has good releasing properties, it is employed as a dental impression agent. The impression agent is used in the mouth. The use of water-repellent silicone rubber makes it difficult to form an accurate copy of a complicated object or shape. Thus, it becomes essential to rely on dentist's technique for the accurate copying. Accordingly, there is a strong demand for development of silicone rubbers having hydrophilic properties.

SUMMARY OF THE INVENTION

It is accordingly an object of the invention to provide a cured silicone rubber elastomer having a hydrophilic surface.

It is another object of the invention to provide a curable composition which has a hydrophilic surface after curing and shows good performance when used as a dental impression agent and also a cured product obtained from the composition.

It is a further object of the invention to provide a curable composition which has not only hydrophilic properties but also properties of swelling by absorption of water after curing and is thus able to provide a sealant with a good appearance and also a cured product obtained therefrom.

The above objects can be achieved, according to the invention, by a curable composition which comprises:

an organopolysiloxane-polyoxyalkylene block copolymer terminated at both ends of a molecular chain with a lower aliphatic unsaturated group and consisting essentially of organopolysiloxane units having a main chain of the formula, $(R^1R^2SiO)_m$, and polyoxyalkylene units of the formula, $(R^3O)_n$, the organopolysiloxane units and the polyoxyalkylene units being bonded through $R^1R^2SiR^4$ groups, wherein $R^1$ and $R^2$ independently represent an unsubstituted or substituted monovalent hydrocarbon group having from 1 to 8 carbon atoms except for an aliphatic unsaturated group, $R^3$ and $R^4$ independently represent a divalent hydrocarbon group having from 2 to 4 carbon atoms, m is an integer of from 2 to 50, and n is an integer not less than 1;

an organohydrogenpolysiloxane having at least two $\equiv$SiH groups in one molecule; and a curing agent.

Further, a cured product obtained from the above composition is also within the scope of the invention. The cured product has hydrophilic properties on the surface thereof.

DETAILED DESCRIPTION AND EMBODIMENTS OF THE INVENTION

The first ingredient of the curable composition according to the invention is an organopolysiloxane-organopolyoxyalkylene block copolymer. This copolymer can be obtained by addition hydrosilylation reaction between an organopolyoxyalkylene polymer having a lower aliphatic unsaturated group at both ends of a molecular chain and a main chain of recurring units of the formula, $(R^3O)_n$, and an organopolysiloxane having an $HR^1R^2SiO_{\frac{1}{2}}$ unit at both ends thereof in the presence of a catalyst such as chloroplatinic acid.

The organopolyoxyalkylene polymer having a lower aliphatic unsaturated group at both ends of the molecular chain may be represented by the formula, $R^6O(R^3O)_nR^6$, wherein $R^3$'s have, respectively, the same meaning as defined above and are a divalent hydrocarbon group having from 2 to 4 carbon atoms including an ethylene group, a propylene group and a butylene group, and $R^6$ represents a lower aliphatic unsaturated group such as a vinyl group, an allyl group, a butenyl group and the like, and n is an integer not less than 1. When n is an integer of 2 or more, $R^3$'s may be the same or different. In view of the production of the polymer, n is preferably an integer of not larger than 300. More particularly, those polymers of the above formula where n is over 300 are difficult to prepare industrially and become so high in viscosity that they are difficult to handle.

The organopolysiloxane having an $HR^1R^2SiO_{\frac{1}{2}}$ unit at both ends of the molecular chain is of the following formula, $HR^1R^2SiO(R^1R^2SiO)_mSiR^1R^2H$, wherein each $R^1$ and each $R^2$, respectively, represent an unsubstituted or substituted monovalent hydrocarbon group, except for an aliphatic unsaturated group, having from 1 to 8 carbon atoms, and m is an integer of from 2 to 50. Examples of the unsubstituted or substituted monovalent hydrocarbon group include an alkyl group such as a methyl group, an ethyl group, a propyl group, a butyl group, a hexyl group, a cyclohexyl group or the like, an aryl group such as a phenyl group, a tolyl group or the like, and those groups mentioned above wherein part or all of the hydrogen atoms are substituted with a halogen atom, such as a chloromethyl group, a 3,3,3-trifluoropropyl group or the like.

For obtaining the first ingredient through the hydrosilylation reaction between the polyoxyalkylene polymer having a lower aliphatic unsaturated group at both ends of the molecular chain and the organopolysiloxane having an $HR^1R^2SiO_{\frac{1}{2}}$ unit at both ends of the molecular chain, the molar ratio between the $HR^1R^2SiO_{\frac{1}{2}}$ units of the organopolysiloxane and the lower aliphatic unsaturated groups of the polyoxyalkylene polymer should be not larger than 1:1. In order to carry out the reaction completely, the molar ratio should preferably be in the range of 0.7 to 0.3:1.

The above hydrosilylation reaction may be performed using any known catalyst for the hydrosilylation reaction. Usually, platinum group metal catalysts similar to those used as the third ingredient described hereinafter are used.

The block copolymer of the first ingredient obtained as described above is of the following general formula

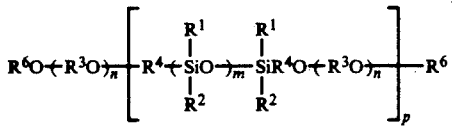

wherein $R^1$, $R^2$, $R^3$, $R^6$, m and n have, respectively, the same meanings as defined before, $R^4$ represents a divalent hydrocarbon group having from 2 to 4 carbon atoms, such as an ethylene group, a propylene group or a butylene group, and p is an integer of from 1 to 10. Specific and preferable examples of the block copolymer are those set forth in Synthetic Examples 1 to 3 and include those of the following formulas (1) to (3).

$$CH_2=CHCH_2O(C_3H_6O)_{80}C_3H_6(CH_3)_2SiO-$$
$$((CH_3)_2SiO)_{20}Si(CH_3)_2C_3H_6O-$$
$$(C_3H_6O)_{80}CH_2CH=CH_2 \quad (1)$$

$$CH_2=CHCH_2O(C_3H_6O)_{20}(C_2H_4O)_{20}C_3H_6(CH_3)_2SiO-$$
$$((CH_3)_2SiO)_{20}Si(CH_3)_2C_3H_6O$$
$$(C_3H_6O)_{20}(C_2H_4O)_{20}CH_2CH=CH_2. \quad (2)$$

$$CH_2=CHCH_2O(C_3H_6O)_{25}(C_2H_4O)_{75}C_3H_6(CH_3)_2SiO-$$
$$((CH_3)_2SiO)_{10}Si(CH_3)_2C_3H_6O-$$
$$(C_3H_6O)_{25}(C_2H_4O)_{75}CH_2CH=CH_2. \quad (3)$$

The organohydrogenpolysiloxane should be any organopolysiloxane having at least two ≡SiH groups in one molecule and may be linear, cyclic or branched in nature or may be mixtures of linear, cyclic and/or branched organopolysiloxanes. The second ingredient may have substituents bonded at silicon atoms other than ≡SiH groups. The substituents include an unsubstituted or substituted monovalent hydrocarbon group, except for an aliphatic unsaturated group, having from 1 to 8 carbon atoms as defined with respect to $R^1$ and $R^2$ of the first ingredient.

Specific examples of the second ingredient include

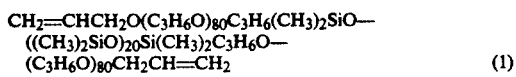

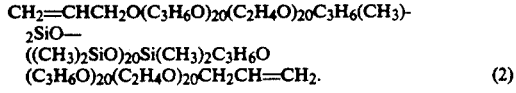

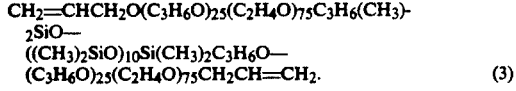

wherein b, c, d, e, f, g, and i are, respectively, zero or a positive integer, and h is an integer of 2 or over,

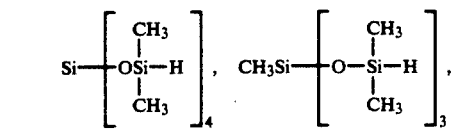

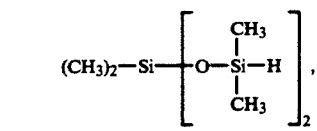

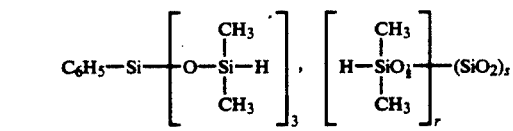

wherein $r>0$ and $s>0$ provided that r/s is from 0.4 to 1 and $r+s=1$, and

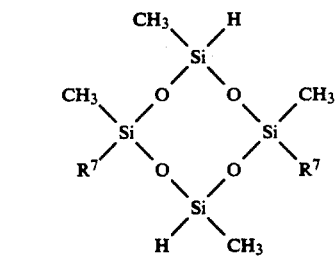

wherein $R^7$ represents a hydrogen atom, a monovalent hydrocarbon group having from 1 to 8 carbon atoms such as an alkyl group, an aryl group or the like, a triorganosiloxy group such as a trimethylsiloxy group.

The organohydrogenpolysiloxane should preferably be used in an amount of from 0.5 to 3.0 moles, more preferably from 1.0 to 2.0 moles per mole of the lower aliphatic unsaturated group of the organopolysiloxane-polyoxyalkylene block copolymer of the first ingredient.

The curing catalyst used as the third ingredient is one which is effective for the hydrosilylation reaction between the organopolysiloxane-polyoxyalkylene block copolymer of the first ingredient and the organohydrogenpolysiloxane of the second ingredient. As set forth before, platinum group metal catalysts are usually employed for this purpose. The amount of the curing catalyst is generally in the range of from 0.1 to 1000 ppm, preferably from 1 to 100 ppm, calculated as a platinum group metal, based on the total amount of the organopolysiloxane-polyoxyalkylene block copolymer of the first ingredient and the organohydrogenpolysiloxane of the second ingredient. The platinum group metal catalysts may be, for example, a finely divided metallic platinum catalyst described in U.S. Pat. No. 2,970,150, a chloroplatinic acid catalyst described in U.S. Pat. No. 2,823,218, platinum-olefin complex compounds as described in U.S. Pat. Nos. 3,159,601 and 3,159,662, platinum-vinylsiloxane complexes described in U.S. Pat. Nos. 3,775,452 and 3,814,780, and the like.

When the catalysts used are solid, they should preferably be finely divided and carriers therefor should preferably be small in size and large in surface area in order to ensure good dispersability. When chloroplatinic acid or complexes of chloroplatinic acid and olefins are used, it is preferred that the acid or complexes are used after dissolution in solvents such as alcohols, ketones, ethers or hydrocarbons.

In the practice of the invention, the hydrosilylation reaction is utilized as the curing reaction. In order to ensure good storage stability at room temperature and an appropriate pot life, reaction controlling agents such as methylvinylcyclotetrasiloxane, acetylene alcohols and the like may be added. The curing reaction may be carried out at a temperature of from 60° to 200° C. for 0.5 to 5 hours.

Moreover, the curable composition of the invention may be formulated with fillers, if necessary, for the purposes of reinforcement and extension. Examples of the fillers include finely divided silica powders such as fumed silica, precipitated silica, powdered silica, fused silica and the like powders, diatomaceous earth, metal oxides such as iron oxide, zinc oxide, titanium oxide, barium oxide, magnesium oxide and the like, metal hydroxides such as cerium hydroxide, metal carbonates such as calcium carbonate, magnesium carbonate and the like, asbestos, glass wool, glass fibers, finely divided mica, carbon black, and those fillers mentioned above which have been subjected to hydrophobic treatment with chain-like organopolysiloxanes, cyclic organopolysiloxanes, hexamethyldisilazane and the like.

If necessary, other known additives may be added including, for example, thixotropy-imparting agents such as polyethylene glycol and its derivatives, pigments, dyes, antioxidants, antistatic agents, flame retardants such as antimony oxide, chlorinated paraffin and the like, thermal conductivity improvers such as boron nitride, aluminum oxide and the like, and adhesiveness-imparting agents such as organosilicon compounds having reactive organic groups such as an amino group, an epoxy group, a mercapto group or the like, or so-called silane coupling agents.

For the application of the curable composition of the invention on substrates, the composition may be diluted with solvents including hydrocarbons such as toluene, xylene, petroleum ether and the like, ketones, esters and the like, from the standpoint of workability. In addition, plasticizers, sagging inhibitors, stainproofing agents, preservatives, bactericides, antifungal agents and the like may be formulated, if desired.

Since the curable composition of the invention is comprised mainly of a copolymer having polyoxyalkylene units in the main chain, the surface after molding exhibits good hydrophilic properties. When the content of the polyoxyalkylene units in the copolymer is appropriately controlled and/or a degree of curing is appropriately controlled, the cured composition will have swelling properties with water. Further, the other prepolymer of the copolymer is an organopolysiloxane, so that the cured product obtained from the composition may be imparted with weatherability, releasing properties, water repellency and the like inherent to the silicone rubber. Thus, the curable composition of the invention is used to provide a sealant which is imparted with good weatherability, waterproofing properties and the like with a good appearance. Also, the composition is usable as a dental impression agent with which a precise form of an intended object can be copied readily.

The present invention is more particularly described by way of examples, which should not be construed as limiting the invention.

SYNTHETIC EXAMPLE 1

474 g of a compound of the formula, $$CH_2=CHCH_2O(C_3H_6O)_{80}CH_2CH=CH_2.$$

(average molecular weight of 4738), 80 g of a compound of the formula, $$H(CH_3)_2SiO((CH_3)_2SiO)_{20}Si(CH_3)_2H,$$

(average molecular weight of 1614) and 200 g of toluene were charged into a one liter separable flask, followed by addition of 0.5 g of an isopropanol solution of 2% chloroplatinic acid as a catalyst. The mixture was heated for reaction at 80° to 90° C. for 3 hours, after which the toluene was distilled off under reduced pressure to obtain a transparent liquid. This liquid was subjected to measurement through infrared spectroscopic analysis, nuclear magnetic resonance spectroscopic (NMR) analysis and gel permeation chromatographic (GPC) analysis, from which the product was found to be a an organopolysiloxane-organopolyoxyalkylene block copolymer terminated with the unsaturated bond at both ends and represented by the formula, $$CH_2=CHCH_2O(C_3H_6O)_{80}C_3H_6(CH_3)_2Si-O-((CH_3)_2SiO)_{20}Si(CH_3)_2C_3H_6O-(C_3H_6O)_{80}CH_2CH=CH_2.$$

SYNTHETIC EXAMPLE 2

The general procedure of Synthetic Example 1 was repeated except that there was used, instead of 474 g of the compound of the formula, $$CH_2=CHCH_2O(C_3H_6O)_{80}CH_2CH=CH_2,$$

214 g of a compound of the formula, $CH_2=CHCH_2O(C_3H_6O)_{20}CH_2CH=CH_2$, (average molecular weight of 2138), thereby obtaining a transparent liquid. This liquid was subjected to measurement in the same manner as in Synthetic Example 1, revealing that it was an organopolysiloxane-organopolyoxyalkylene block copolymer terminated with the unsaturated bond at both ends and represented by the formula, $$CH_2=CHCH_2O(C_3H_6O)_{20}(C_2H_4O)_{20}C_3H_6(CH_3)_2SiO-((CH_3)_2SiO)_{20}Si-(CH_3)_2C_3H_6O(C_3H_6O)_{20}(C_2H_4O)_{20}CH_2CH=CH_2.$$

SYNTHETIC EXAMPLE 3

415 g of a compound of the formula, $$CH_2=CHCH_2O(C_3H_6O)_{25}(C_2H_4O)_{75}CH_2CH=CH_2,$$

(average molecular weight of 4848), 44 g of a compound of the formula, $$H(CH_3)_2SiO((CH_3)_2SiO)_{10}Si(CH_3)_2H,$$

(average molecular weight of 874) and 200 g of toluene were charged into a one liter separable flask, followed by addition of 0.5 g of an isopropanol solution of 2% chloroplatinic acid as a catalyst. The mixture was heated for reaction at 80° to 90° C. for 3 hours, after which the toluene was distilled off under reduced pressure to obtain a transparent liquid. This liquid was subjected to measurement in the same manner as in Synthetic Example 1, from which it was revealed that the liquid product was an organopolysiloxane-organopolyoxyalkylene block copolymer terminated with the unsaturated bond at both ends and represented by the formula, $CH_2=CHCH_2O(C_3H_6O)_{25}(C_2H_4O)_{75}C_3H_6(CH_3)_2SiO-((CH_3)_2SiO)_{10}Si(CH_3)_2C_3H_6O-(C_3H_6O)_{25}(C_2H_4O)_{75}CH_2CH=CH_2$.

EXAMPLES 1 to 3

Compositions of the invention were prepared using formulations indicated in Table 1 and each composition was heated at 80° C. for 1 hour to obtain a 2 mm thick sheet. These sheets were subjected to measurement of a contact angle with water, with the results shown in Table 1.

TABLE 1

| | Example | | |
|---|---|---|---|
| Ingredient | 1 | 2 | 3 |
| Polymer of Synthetic Example 1 | 100 g | | |
| Polymer of Synthetic Example 2 | | 100 g | |
| Polymer of Synthetic Example 3 | | | 100 g |
| $(CH_3)_3SiO(HCH_3SiO)_{20}Si(CH_3)_3$ | 1.8 g | 3.5 g | 1.9 g |
| Isopropanol solution containing 2% of chloroplatinic acid | 0.1 g | 0.1 g | 0.1 g |
| Contact angle of 2 mm thick sheet with water (degree) | 35 | 28 | 25 |

COMPARATIVE EXAMPLES 1 to 3

In the same manner as in Examples 1 to 3 except that the block copolymers having unsaturated groups at both ends and prepared in Synthetic Examples 1 to 3 were replaced by polymers of the following formulas, thereby obtaining 2 mm thick sheets. These sheets were subjected to measurement of a contact angle with water. The results are shown in Table 2.

Formula of the polymer used in Comparative Example 1:

$$CH_2=CHCH_2O(C_3H_6O)_{80}CH_2CH=CH_2$$

Formula of the polymer used in Comparative Example 2:

$$CH_2=CHCH_2O(C_3H_6O)_{20}(C_2H_4O)_{20}CH_2CH=CH_2$$

Formula of the polymer used in Comparative Example 3:

$$CH_2=CHCH_2O(C_3H_6O)_{25}(C_2H_4O)_{75}CH_2CH=CH_2$$

TABLE 2

| | Comparative Example | | |
|---|---|---|---|
| Ingredient | 1 | 2 | 3 |
| Polymer of Synthetic Example 1 | 100 g | | |
| Polymer of Synthetic Example 2 | | 100 g | |
| Polymer of Synthetic Example 3 | | | 100 g |
| $(CH_3)_3SiO(HCH_3SiO)_{20}Si(CH_3)_3$ | 4.3 g | 9.5 g | 4.2 g |
| Isopropanol solution containing 2% of chloroplatinic acid | 0.1 g | 0.1 g | 0.1 g |
| Contact angle of 2 mm thick sheet with water (degree) | 75 | 50 | 55 |

The results of the above examples and comparative examples give evidence that when using the curable compositions of the invention, the surface of the resultant cured products is very hydrophilic in nature.

EXAMPLE 4 AND COMPARATIVE EXAMPLE 4

100 g of the organopolysiloxane-polyoxyalkylene block copolymer obtained in Synthetic Example 1 as having the unsaturated group at both ends and 20 g of hydrophobic fumed silica having a specific surface area of 170 m²/g and treated with dimethyldichlorosilane on the surface thereof were kneaded by means of a three-roll mill to obtain a transparent paste-like base compound. 100 g of the base compound, 3.0 g of organopolysiloxane of the formula, $(CH_3)_3SiO(HCH_3SiO)_{20}Si(CH_3)_3$, and 0.1 g of an isopropanol solution of 2% of chloroplatinic acid were uniformly mixed, followed by curing at 100° C. for 1 hour to obtain a 2 mm thick cured sheet. Similarly, the above composition was coated on a transparent sheet glass in a uniform thickness of 0.5 mm and cured under the same conditions as indicated above.

For comparison, the above procedure was repeated except that instead of the organopolysiloxane-polyalkylene block copolymer, 100 g of the polymer of Comparative Example 1 was used, thereby obtaining a transparent paste-like base compound. 100 g of the base compound, 4.8 g of organopolysiloxane of the formula, $(CH_3)_3SiO(HCH_3SiO)_{20}Si(CH_3)_3$, and 0.1 g of an isopropanol solution of 2% of chloroplatinic acid were uniformly mixed, followed by curing at 100° C. for 1 hour to obtain a 2 mm thick cured sheet. Similarly, the above composition was coated on a transparent sheet glass in a uniform thickness of 0.5 mm and cured under the same conditions as indicated above.

The characteristic properties of the 2 mm thick sheets were determined with the results shown in Table 3. The samples of the uniform coatings with a thickness of 0.5 mm on transparent sheet glass were subjected to outside exposure to determine a degree of stain through measurement of a visible light transmittance. The results are also shown in Table 3.

TABLE 3

| Physical Properties of 2 mm Thick Sheet | Ex. 4 | Comp. Ex. 4 |
|---|---|---|
| hardness (JIS-A) | 25 | 30 |
| tensile strength (Kg/cm²) | 18 | 15 |
| elongation (%) | 350 | 150 |
| contact angle of the sheet with water (degree) | 35 | 55 |
| visible light transmittance after exposure to outside (%): | | |
| initial | 90 | 90 |
| after six months | 80 | 50 |
| after one year | 80 | 25 |
| after two years | 75 | 20 |

The results of the above example and comparative example reveal that the curable composition of the invention is excellent as a sealant.

EXAMPLE 5

100 g of the organopolysiloxane-polyoxyalkylene block copolymer obtained in Synthetic Example 3 as having the unsaturated group at both ends and 200 g of crystalline silica with a size of 5 μm were uniformly mixed by the use of a mixer to obtain a paste-like compound. 100 g of the compound, 5.7 g of organopolysiloxane of the formula, $(CH_3)_3SiO((CH_3)_2SiO)_{10}(HCH_3SiO)_5(CH_3)_3$ and 0.1 g of an isopropanol solution of 2% of chloroplatinic acid were uniformly mixed, followed by curing at 100° C. for 1 hour to obtain a 2 mm thick cured sheet.

The physical properties of the cured sheet were as follows.
hardness (JIS-A): 60
tensile strength (kg/cm$^2$): 25
elongation (%): 100
contact angle of the sheet with water (degree): 35

Thus, it was confirmed that the surface hydrophilic properties could be improved without a sacrifice of other physical properties.

EXAMPLE 6 AND COMPARATIVE EXAMPLE 5

The 2 mm thick sheets obtained in Example 3 and Comparative Example 3 were each cut into pieces having a size of 50 mm×50 mm, followed by immersion in a one liter beaker containing 500 ml of water and measurement of a variation rate of the volume at 20° C. The results are shown below.

| Immersion Time | Example 6 | Comparative Example 5 |
| --- | --- | --- |
| 24 hours | 350% | 150% |
| 48 hours | 400% | 200% |
| 96 hours | 450% | 250% |

What is claimed is:

1. A curable composition which comprises:
   an organopolysiloxane-polyoxyalkylene block copolymer terminated at both ends of a molecular chain with a lower aliphatic unsaturated group and consisting essentially of organopolysiloxane units having a main chain of the formula, $(R^1R^2SiO)_m$, and polyoxyalkylene units of the formula, $(R^3O)_n$, the organopolysiloxane units and the polyoxyalkylene units being bonded through $R^1R^2SiR^4$ groups, wherein $R^1$ and $R^2$ independently represent an unsubstituted or substituted monovalent hydrocarbon group having from 1 to 8 carbon atoms except for an aliphatic unsaturated group, $R^3$ and $R^4$ independently represent a divalent hydrocarbon group having from 2 to 4 carbon atoms, m is an integer of from 2 to 50, and n is an integer of not less than 1, provided that when n is greater than 1, the $R^3$'s may be the same or different;
   an organohydrogenpolysiloxane having at least two ≡SiH groups in one molecule, said organohydrogenpolysiloxane being included in an amount such that the at least two ≡SiH groups are present in an amount of from 0.5 to 3.0 moles per mole of the terminal lower aliphatic unsaturated group of the organopolysiloxane-polyoxyalkylene block copolymer; and
   a curing agent included in an amount sufficient to cause a curing hydrosilylation reaction between the block copolymer and the organohydrogenpolysiloxane.

2. The curable composition according to claim 1, wherein the block copolymer is of the following general formula

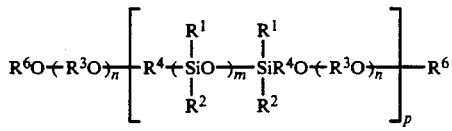

wherein $R_1$, $R_2$, $R_3$, $R_4$, m and n have, respectively, the same meanings as defined in Claim 1, $R^6$ represents a lower aliphatic unsaturated group, and p is an integer of from 1 to 10.

3. The curable composition according to claim 2, wherein said block copolymer is of the following formula, $CH_2=CHCH_2O(C_3H_6O)_{80}C_3H_6(CH_3)_2SiO—((CH_3)_2SiO)_{20}Si(CH_3)_2C_3H_6O—(C_3H_6O)_{80}CH_2CH=CH_2$.

4. The curable composition according to claim 2, wherein said block copolymer is of the following formula, $CH_2=CHCH_2O(C_3H_6O)_{20}(C_2H_4O)_{20}C_3H_6(CH_3)_2SiO—((CH_3)_2SiO)_{20}Si(CH_3)_2C_3H_6O(C_3H_6O)_{20}(C_2H_4O)_{20}CH_2CH=CH_2$.

5. The curable composition according to claim 2, wherein said block copolymer is of the following formula, $CH_2=CHCH_2O(C_3H_6O)_{25}(C_2H_4O)_{75}C_3H_6(CH_3)_2SiO—((CH_3)_2SiO)_{10}Si(CH_3)_2C_3H_6O—(C_3H_6O)_{25}(C_2H_4O)_{75}CH_2CH=CH_2$.

6. The curable composition according to claim 1, wherein said organohydrogenpolysiloxane is linear, cyclic or branched in nature.

7. The curable composition according to claim 1, wherein said organohydrogenpolysiloxane has substituents other than the at least two ≡SiH groups, directly bonded to the silicon atoms of said organohydrogenpolysiloxane, said substituents being, respectively, an unsubstituted or substituted monovalent hydrocarbon having from 1 to 8 carbon atoms except for an aliphatic unsaturated group.

8. The curable composition according to claim 1, wherein said curing catalyst is a platinum group metal-based catalyst.

9. The curable composition according to claim 1, wherein said platinum group metal-based catalyst is used in an amount of from 0.1 to 1,000 ppm based on the total amount of said organopolysiloxane-polyoxyalkylene block copolymer and said organohydrogenpolysiloxane.

10. A cured product of the curable composition as contained in claim 1.

* * * * *